United States Patent
Lesesky

(10) Patent No.: US 6,753,771 B2
(45) Date of Patent: Jun. 22, 2004

(54) VEHICLE MONITORING SYSTEM

(75) Inventor: Alan C. Lesesky, Charlotte, NC (US)

(73) Assignee: Indian Head Industries, Inc., Charlotte, NC (US)

( * ) Notice: Subject to any disclaimer, the term of this patent is extended or adjusted under 35 U.S.C. 154(b) by 184 days.

(21) Appl. No.: 10/342,947

(22) Filed: Jan. 15, 2003

(65) Prior Publication Data

US 2003/0214396 A1 Nov. 20, 2003

Related U.S. Application Data

(63) Continuation-in-part of application No. 10/144,969, filed on May 14, 2002, now abandoned.

(51) Int. Cl.⁷ .................................................. B60Q 1/44
(52) U.S. Cl. .................... 340/479; 340/450.1; 340/452; 340/453; 340/454; 188/1.11 E; 188/1.11 W
(58) Field of Search ................................ 340/479, 453, 340/452, 454, 450.1; 188/1.11 E, 1.11 W

(56) References Cited

U.S. PATENT DOCUMENTS

| | | |
|---|---|---|
| 1,302,928 A | 5/1919 | Page et al. |
| 2,183,700 A | 12/1939 | Sinclair |
| 2,554,065 A | 5/1951 | Shields |
| 2,873,436 A | 2/1959 | Avrea |
| 3,571,800 A | 3/1971 | Taylor |
| 3,622,926 A | 11/1971 | Risk |
| 3,654,549 A | 4/1972 | Mauerer et al. |
| 3,776,329 A | 12/1973 | Hope et al. |
| 3,808,593 A | 4/1974 | Kopernik et al. |
| 3,845,430 A | 10/1974 | Petkewicz et al. |
| 4,013,143 A | 3/1977 | Juhsaz |
| 4,279,214 A | 7/1981 | Thorn |
| 4,364,011 A | 12/1982 | Bloomfield et al. |
| 4,468,650 A | 8/1984 | Barbee |
| 4,471,304 A | 9/1984 | Wolf |
| 4,476,449 A | 10/1984 | Gray et al. |
| 4,583,071 A | 4/1986 | Sebalos et al. |
| 4,642,603 A | 2/1987 | Martinez, Jr. |
| 4,649,370 A | 3/1987 | Thomason |
| 4,674,338 A | 6/1987 | Carpenter |
| 4,749,063 A | 6/1988 | Garrett et al. |
| 4,757,300 A | 7/1988 | Sebalos |
| 4,800,991 A | 1/1989 | Miller |
| 4,855,712 A | 8/1989 | Wiley, Jr. et al. |
| 4,883,150 A | 11/1989 | Arai |
| 4,914,916 A | 4/1990 | Leigh-Monstevens et al. |
| 4,937,554 A | 6/1990 | Herman |
| 4,989,537 A | 2/1991 | Hutchinson, Sr. et al. |
| 5,044,302 A | 9/1991 | Goldfein et al. |
| 5,087,907 A | 2/1992 | Weiler et al. |

(List continued on next page.)

FOREIGN PATENT DOCUMENTS

| | | |
|---|---|---|
| DE | 1245190 | 3/1965 |
| GB | 2232770 | 3/1990 |
| JP | 62286816 | 12/1987 |
| JP | 63255114 | 10/1988 |

Primary Examiner—Daryl Pope
(74) Attorney, Agent, or Firm—Howard & Howard

(57) ABSTRACT

A vehicle monitoring system for monitoring a condition of relatively moving vehicle components, particularly including the pushrod of a brake actuator, including a magnet on one of the components, a sensor on the other component within the magnetic field of the magnet generating a signal indicating a condition of the moving component, an electrically conductive coil preferably surrounding the magnet generating a current and an active RF chip connected to the coil and the sensor, thereby providing current to the active RF chip for signaling a receiver. In the disclosed embodiment of a brake actuator monitoring system, the magnet is fixed on the pushrod and the coil surrounds the pushrod and magnet.

19 Claims, 2 Drawing Sheets

U.S. PATENT DOCUMENTS

| | | |
|---|---|---|
| 5,140,932 A | 8/1992 | Goldfein et al. |
| 5,178,092 A | 1/1993 | Schedin |
| 5,213,056 A | 5/1993 | Nicholls et al. |
| 5,226,509 A * | 7/1993 | Smith .................... 188/1.11 W |
| 5,253,735 A | 10/1993 | Larson et al. |
| 5,266,917 A | 11/1993 | Bleeke et al. |
| 5,285,190 A | 2/1994 | Humphreys et al. |
| 5,302,939 A | 4/1994 | Downs et al. |
| 5,320,198 A | 6/1994 | Hoyt et al. |
| 5,322,641 A | 6/1994 | Shiel et al. |
| 5,339,069 A | 8/1994 | Penner et al. |
| 5,358,075 A | 10/1994 | Jarzombek |
| 5,394,137 A | 2/1995 | Orschek |
| 5,433,296 A | 7/1995 | Webberley |
| 5,450,930 A | 9/1995 | Martens et al. |
| 5,472,539 A | 12/1995 | Saia et al. |
| 5,535,854 A | 7/1996 | Prince |
| 5,545,368 A | 8/1996 | Vinarcik |
| 5,572,187 A | 11/1996 | Williford |
| 5,586,532 A * | 12/1996 | Faletti et al. ................ 123/321 |
| 5,619,964 A * | 4/1997 | Feucht ........................ 123/321 |
| 5,647,318 A * | 7/1997 | Feucht et al. ............... 123/322 |
| 5,699,880 A * | 12/1997 | Hockley ................ 188/1.11 W |
| 5,825,287 A | 10/1998 | Zarybnicky, Sr. et al. .. 340/479 |
| 6,135,242 A * | 10/2000 | Hockley ................ 188/1.11 R |
| 6,155,385 A * | 12/2000 | Basnett ...................... 188/72.7 |
| 6,175,292 B1 * | 1/2001 | Gruden ........................ 335/267 |
| 6,215,394 B1 * | 4/2001 | Sellin ........................ 340/453 |

* cited by examiner

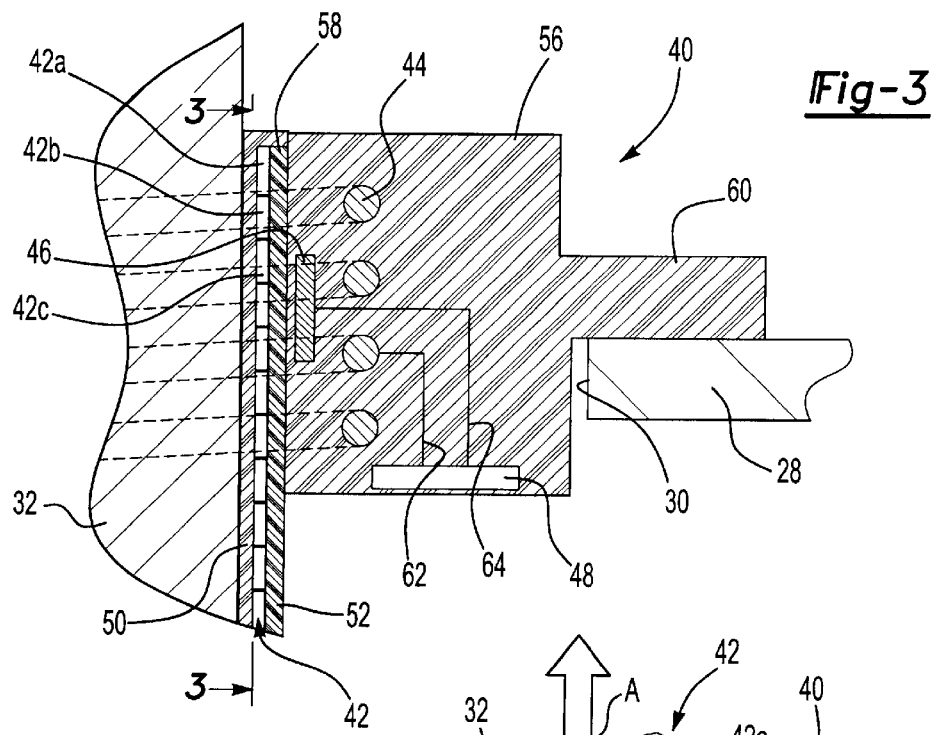
*Fig-3*
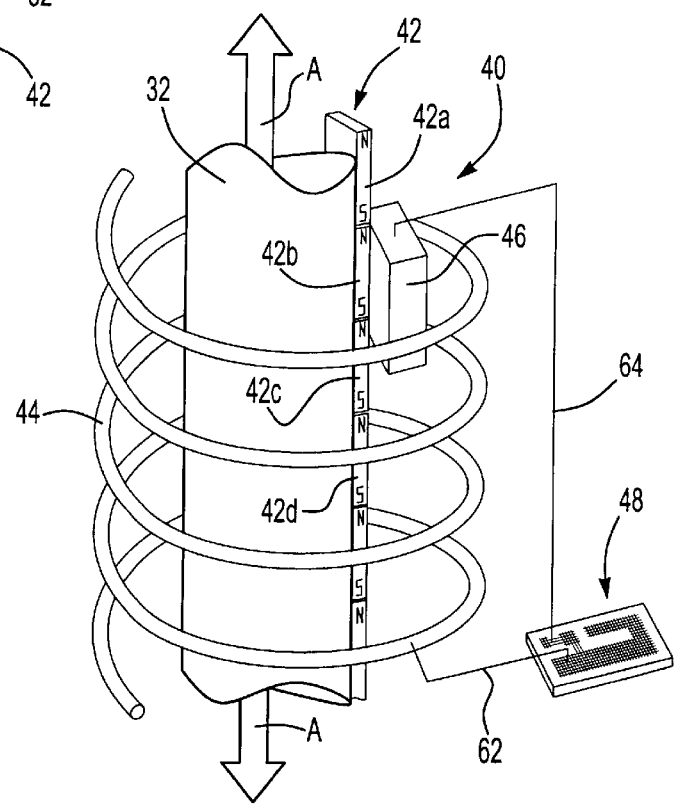
*Fig-4*
*Fig-5*

VEHICLE MONITORING SYSTEM

RELATED APPLICATIONS

This application is a continuation-in-part application of pending U.S. patent application Ser. No. 10/144,969, filed May 14, 2002 abandoned, which claims priority to U.S. Pat. No. 6,501,375, filed Nov. 30, 1998, which claims priority to International Application PCT/US 97/18846, filed Oct. 11, 1996 and to U.S. Provisional Patent Application No. 60/027,706, filed Oct. 11, 1996 and to U.S. Pat. No. 5,825,287, filed Feb. 2, 1995.

FIELD OF THE INVENTION

This invention relates to a vehicle monitoring system for monitoring a condition of a first component moving relative to a second component particularly including, but not limited to a vehicle brake actuator monitoring system for monitoring the position of the brake actuator pushrod.

BACKGROUND OF THE INVENTION

There is a growing demand to monitor the condition of various vehicle components to signal the requirement for adjustment, repair or replacement. Examples are heavy vehicle brake actuators, slack adjusters, tires and the like. As described further below, the above-referenced prior application proposes a brake actuator monitoring system which includes a magnet on the moving component which, in a brake actuator is the pushrod, a sensor on the fixed component and an RF chip connected to the sensor. Reciprocal motion of the pushrod of the brake actuator may then be monitored to signal brake wear and the requirement for repair or replacement of the brake of the vehicle. However, absent a power source for the RF chip, a passive RF chip must be utilized having a very limited range or a separate source of electrical power must be provided, such as a battery. As will be recognized by those skilled in this art, it would be desirable to utilize an active RF chip to continuously monitor the condition of the moving component of the vehicle having a much greater range. A battery, however, is also subject to failure and must be periodically replaced. It would thus be desirable to utilize an active RF chip in a monitoring system of the type described and utilize the movement of the moving vehicle component as a source of electrical power for an active RF chip which is an object of this invention. The invention will now be described with regard to a brake actuator monitoring system. However, as set forth above, the vehicle monitoring system of this invention may be utilized to monitor other vehicle components provided one of the vehicle components is moving relative to the other vehicle component.

Heavy duty vehicles including trucks, buses, trailers, large recreational vehicles or coaches and the like are typically equipped with a pneumatic or air brake actuating system. The pneumatic brake actuating system applies air to a service chamber of a brake actuator to move a pushrod connected to the vehicle brake actuating system and actuate the vehicle brakes. In a diaphragm-type brake actuator, the pneumatic brake actuating system applies air pressure to one side of the diaphragm, thereby extending the pushrod to actuate the vehicle braking system. In a piston-type brake actuator, pneumatic pressure is applied to the head of the pushrod, extending the pushrod to actuate the vehicle braking system. In a piggyback brake actuator, an emergency chamber is attached to the service chamber and is operable to move the pushrod to actuate the braking system in the event that the pneumatic or air system of the vehicle fails. The emergency chamber includes a powerful spring to actuate the pushrod when there is a failure in the pneumatic system of the vehicle. The power spring also actuates the pushrod when the vehicle is parked thereby serving as a parking brake.

A brake actuator has a predetermined available movement or stroke for the pushrod. The movement of the pushrod required to fully actuate the braking system of the vehicle must be carefully monitored, such that it is within the stroke of the brake actuator. Typically, excessive movement is due to brake lining wear. As the brakes wear, greater movement of the pushrod is required to actuate the brakes. Further, as the linkages, connections, etc. between the components connecting the pushrod to the brakes may bend or become loose or excessively worn, requiring additional pushrod movement to adequately stroke the brake. A combination of these several factors may cause the available pushrod movement required to actuate the braking system of the vehicle to approach the available pushrod stroke from the brake actuator. As will be understood from those skilled in this art, this condition requires prompt maintenance of the braking system of the vehicle to avoid an unsafe condition.

The prior art has attempted to monitor pushrod movement during actuation of the braking system of the vehicle and provide an indication to an operator when there is excessive pushrod movement. The determination of when there is excessive pushrod movement is dependent upon the design or rated stroke of the brake actuator. In addition, an apparatus known as a "slack adjuster" is typically placed between the pushrod and the vehicle foundation brake. The slack adjuster is incrementally adjusted to compensate for slack in the braking system and to decrease the required pushrod movement of the brake actuator. Automatic slack adjusters are now available which automatically adjust the foundation brake system of the vehicle.

Electronic stroke indicator systems for brake actuators have also been proposed, particularly including the prior patents of the assignee of this application. However, there are several obstacles to overcome. First, powering and monitoring electronic stroke indicators for brake actuators on each brake actuator of an 18-wheel heavy vehicle is costly. The cost of wiring alone for the vehicle generally exceeds the cost of all the electronic indicators and monitoring equipment combined. Further, the hostile environment in which the brake actuators are monitored on the undercarriage of the heavy vehicle can damage wires connecting the brake actuator to a controller for example. Further, there are numerous configurations for the trailer as well as the cab in a tractor-trailer combination. Each axle must include a spring brake actuator as well as a service brake actuator. For efficiency and to reduce costs, it would be most desirable to utilize an "active" RF chip to eliminate the requirement for wires between the electronic brake actuator indicator systems. However, as set forth above, an active RF chip requires power or electronic current to activate the active RF chip. The vehicle monitoring system of this invention provides power to an active RF chip without requiring a battery, thus eliminating the requirement for wires between the vehicle monitoring system and a receiver as set forth below.

SUMMARY OF THE INVENTION

As set forth above, the vehicle monitoring system of this invention may be utilized for monitoring a condition of a first vehicle component moving relative to a second component and is therefore not limited to monitoring the stroke of a pushrod of a brake actuator. However, the vehicle monitoring system of this invention is particularly, but not exclusively, suitable for electronically monitoring the stroke of a brake actuator pushrod, wherein the brake actuator housing is fixed relative to the vehicle and the pushrod periodically moves relative to the housing upon actuation of the vehicle braking system.

In the vehicle monitoring system of this invention, one of the first and second components includes a magnet and the other component includes an electrically conductive coil within the magnetic field of the magnet. A sensor is connected to the coil and an active RF chip is connected to the coil and the sensor which monitors the movement of the magnet relative to the electronically conductive coil. The relative movement of the magnet and the coil generates an electric current which activates the RF chip to signal a receiver of the condition of the second or moving component. In a preferred embodiment of the vehicle monitoring system of this invention, the magnet is located within the coil or more preferably moves or reciprocates through the coil thereby providing sufficient electrical current to the active RF chip to signal a remote receiver of the condition of the first component of the vehicle monitoring system.

As set forth above, in a preferred embodiment of the vehicle monitoring system of this invention, the first or fixed component is a brake actuator including a housing having an opening through the housing and the second component is a pushrod reciprocating through the opening in the housing and actuating the vehicle braking system. In a preferred embodiment, the magnet is fixed on the pushrod and the electrically conductive coil is fixed relative to the housing, surrounding the opening through the housing. In the disclosed embodiment, the magnet comprises an elongated strip including a series of magnets in end to end relation and the sensor thus continuously senses the precise position of the pushrod as it reciprocates through the housing opening to actuate the vehicle foundation brake. The electrically conductive coil may be incorporated or potted in a sleeve which surrounds the opening through the housing, such as a conventional polymeric stone shield. The sensor is preferably located adjacent the opening through the housing and may also be incorporated or potted in the stone shield. Finally, the active RF chip may also be incorporated or potted in the stone shield, providing a fixed secure assembly which is not vulnerable to the adverse environment of a brake actuator.

The vehicle brake actuator monitoring system of this invention may be utilized to sense and signal various conditions of the brake actuator, including an overstroke condition, wherein the stroke of the pushrod is nearing or has reached an overstroke condition, signaling the vehicle operator or maintenance worker that maintenance of the vehicle foundation brake is required. However, the brake actuator monitoring systems of this invention may be utilized to signal other conditions of the brake actuator including a "hanging brake" condition, wherein the brake actuator fails to extend during braking, such as when the pneumatic braking system of the vehicle is removed from park. The brake actuator monitoring system of this invention may also be utilized to signal other conditions including, for example, a defective spring.

Other advantages and meritorious features of the vehicle monitoring system and brake monitoring system of this invention will be more fully understood from the following description of the preferred embodiments, the appended claims and the drawings, a brief description of which follows.

BRIEF DESCRIPTION OF THE DRAWINGS

FIG. 3 is an enlarged cross-sectional side view of FIG. 2 in the direction of view arrow 3;

FIG. 4 is a side view of one embodiment of the magnet; and

FIG. 5 is a side exploded perspective view of the components of the brake actuator monitoring system assembly shown in FIGS. 2 and 3.

DESCRIPTION OF THE PREFERRED EMBODIMENTS

As set forth above, the vehicle monitoring system of this invention may be utilized to signal various conditions of a moving component of a vehicle, such as the pushrod of a brake actuator. Although the vehicle monitoring system of this invention is not limited to a brake actuator monitoring system, the vehicle monitoring system of this invention will now be described with regard to a brake actuator monitoring system as disclosed as one example only of the vehicle monitoring system of this invention.

Figure 1:
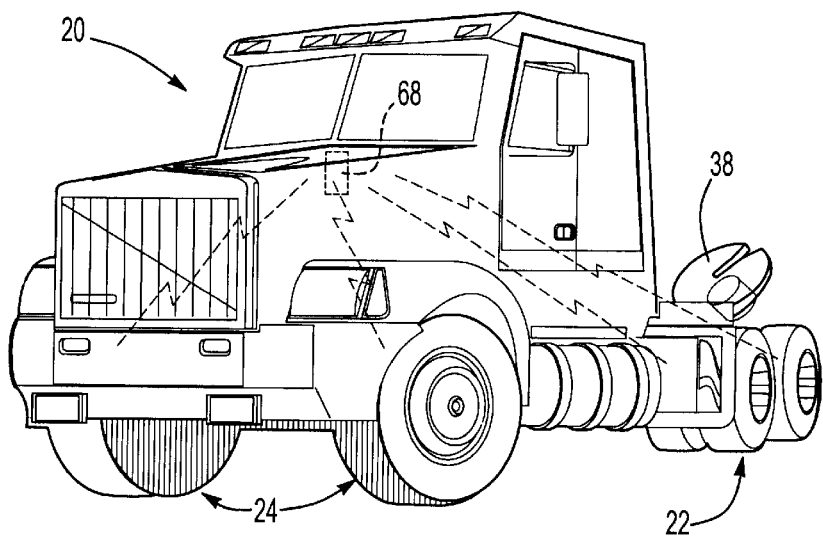
FIG. 1 is a side perspective view of a cab of a conventional tractor-trailer incorporating the vehicle monitoring system of this invention.

FIG. 1 illustrates a conventional cab 20 of a tractor-trailer incorporating the vehicle monitoring system of this invention. As will be understood, however, the brake monitoring system of this invention may be utilized with any conventional heavy duty vehicle including but not limited to trucks, buses, trailers and tractor-trailer combinations by way of example only. The disclosed cab 20 includes three axles rotatably supporting rear wheels 22 and front wheels 24. Each axle includes a pneumatic brake actuator partially illustrated at 26 in FIG. 2. The disclosed brake actuator 26 includes a housing 28 having an opening 30 therethrough and a piston or pushrod 32 reciprocates through the opening 30 as shown by arrow A to actuate the foundation brake of the vehicle (not shown). As will be understood by those skilled in this art, there are several types of commercially available brake actuators, including piston-type brake actuators and diaphragm-type brake actuators. The disclosed embodiment is a diaphragm-type brake actuator. However, the brake actuator monitoring system of this invention may be utilized with any type of brake actuator.

In the disclosed embodiment of the brake actuator 26, the pushrod 32 includes a pushrod plate 34 welded or otherwise secured to the pushrod 32 and a flexible diaphragm 36 having a periphery (not shown) is retained by the housing 28 and reciprocates under pneumatic pressure to extend the pushrod and actuate the foundation brake of the vehicle. Each axle includes a brake actuator 26 and, assuming that the trailer (not shown) attached to the fifth wheel 38 includes an additional six axles, the tractor-trailer will include nine axles, each including a brake actuator. In the prior patents and applications of the assignee of this application, each of the brake actuator monitoring systems were connected to each other by wires and the brake actuators were connected to a receiver located in the cab. Alternatively, as disclosed in the above-referenced application, the brake actuator monitoring systems included a passive RF chip having a very limited range of a few inches. The vehicle monitoring system of this invention, however, includes an active RF chip and the relative motion of the components generates the current required for the active RF chip as now described.

The disclosed embodiment of the brake actuator monitoring system 40 of this invention includes a magnet 42, an electrically conductive coil 44 within the magnet field of the magnet 42, a sensor 46 and an active RF chip 48. In the disclosed embodiment, the magnet 42 is fixed relative to the pushrod 42 and the electrically conductive coil 44, sensor 46 and active RF chip 48 are fixed relative to the housing as described further below.

Figure 2:
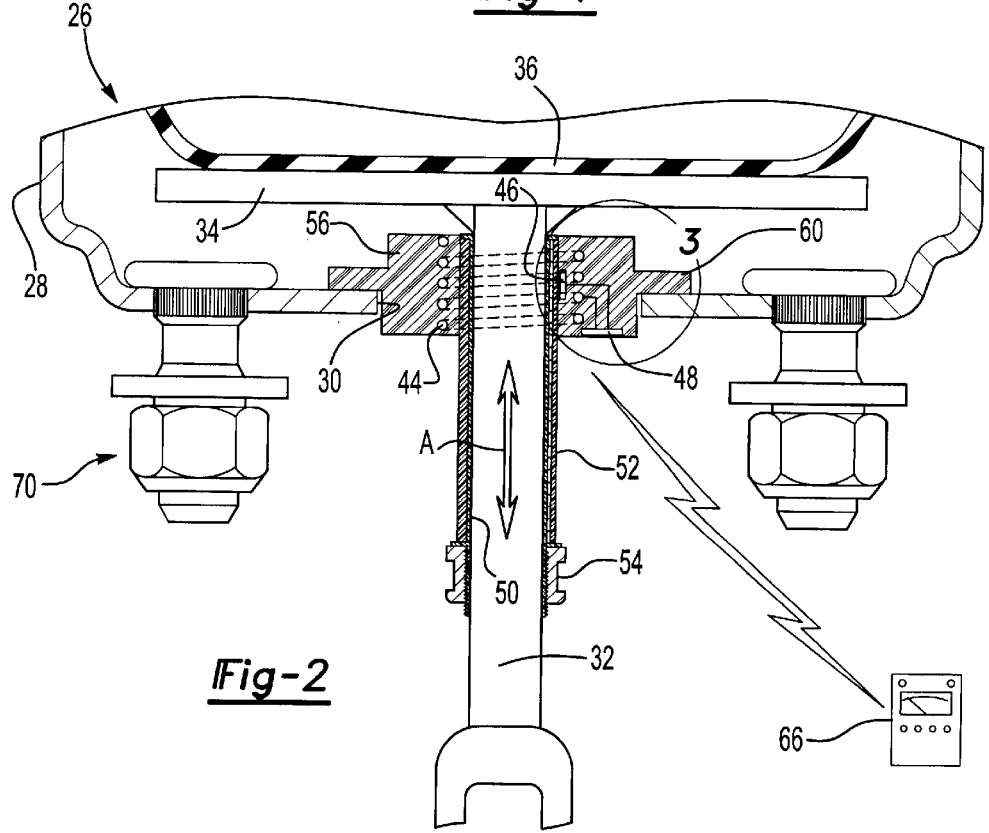
FIG. 2 is a partial side cross-sectional view of a conventional brake actuator incorporating one embodiment of the electrical brake actuator monitoring system of this invention.

As best shown in FIG. 3, the magnet 42 is fixed to the pushrod by a sleeve comprising an inner tubular sleeve member 50 and an outer sleeve 52 which enclose the magnet 42 and the sleeves are fixed on the pushrod by a lock nut 54, as shown in FIG. 2, wherein the magnet 42 is adjusted relative to the sensor 46 during assembly and fixed by the lock nut 54 as described in a prior patent of the assignee of this application.

In the disclosed embodiment, the sensor 46, active RF chip 48 and electrically conductive coil 44 are molded or potted in a nonconductive polymeric sleeve 56 which, in the disclosed embodiment, also functions as a stone shield. That is, the stone shield 56 is received within the opening 30 of the housing 28 and includes a central opening 58 shown in FIG. 3 which receives the pushrod 32 and prevents entry of foreign material into the housing as is well known to those skilled in this art. In the disclosed embodiment, the stone shield 56 includes an annular rim portion 60 which retains the stone shield in the housing 28 following assembly.

As shown in FIGS. 3 and 5, the electrically conductive coil 44 is within the magnetic field of the magnet 42 and the magnet 42 reciprocates with the pushrod 32 through the coil 44, such that upon movement of the pushrod 32, generates an electric current in the coil 44. The electrically conductive coil 44 is connected by wire 62 to the active RF chip 48, such that the current generated in the coil 44 is transmitted by wire 62 to the RF chip 48 providing power to the RF chip. The sensor 46 is also located within the magnetic field of the magnet 58, such that the sensor 46 senses the location of the magnet 42 relative to the sensor 46 to determine the axial location of the pushrod 32. In the disclosed embodiment, the magnet 42 comprises a series of discrete magnets 42a, 42b, 42c, 42d, etc. as best shown in FIG. 4, such that the sensor can continuously accurately sense and signal the axial position of the pushrod 32 relative to the sensor 46. The sensor 46 is connected by wire 64 to the active RF chip 48 as shown in FIGS. 3 and 5. Magnetic strips of the type shown in FIG. 4 are commercially available. The sensor 46 may be a conventional Hall-effect sensor which is also commercially available. Various active RF chips are also commercially available from various sources including, for example, Microchip Technology Inc. and Phillips Electronics. The signal from the sensor 46 is thus transmitted through wire 64 to the active RF chip 48 and the active RF chip then sends a signal of the position of the pushrod 32 to a receiver, such as the handheld receiver 66 shown in FIG. 2 or a receiver 68 in the cab 20 shown in FIG. 1. The brake actuator monitoring system thus provides a continuous indication of the position of the pushrod 32 relative to the housing 28 of the brake actuator 26 indicating the condition of the foundation brakes of the vehicle (not shown) and the brake actuator as described above.

As will be understood from the above description of the brake actuator monitoring system 40, the position of the pushrod 32 is continuously monitored by the sensor 46 which is located within the magnet field of the magnet 42 because the magnet 42 is fixed on the pushrod 32 and reciprocates with the pushrod of the brake actuator opposite the sensor 46. The reciprocal motion of the pushrod 32 and the magnet 42 through the coil 44 generates an electric current in the electrically conductive coil 44 which is transmitted through wire 62 to the active RF chip 48. The active RF chip 48 also receives a signal from the sensor 46 through wire 64 indicating the axial position of the pushrod 32. The active RF chip 48 then transmits a signal indicating the axial position of the pushrod 32 to a receiver, such as the handheld receiver 66 shown in FIG. 2 or the in-cab receiver 68 shown in FIG. 1. As will be understood by those skilled in this art, the housing 28 of the brake actuator 26 is fixed to a frame member (not shown) adjacent an axle of the wheels 22 and 24, such as by bolts 70.

Various modifications may be made to the vehicle monitoring system of this invention within the purview of the appended claims. For example, as set forth above, the brake actuator monitoring system 40 may be utilized with any type of brake actuator, including piston-type brake actuators (not shown) and diaphragm-type brake actuators 26 shown in FIG. 2. Further, the vehicle monitoring system of this invention may be utilized to monitor a condition of other relatively moving components of a vehicle. As an example only, the vehicle monitoring system of this invention may be utilized to continuously monitor the tire pressure of the wheels 22 and 24 of the vehicle, wherein the axle includes a magnet or an electrically conductive coil and the sensor is a bladder-type pressure sensor located within the tires. The relative movement of the wheels relative to the axle would then generate electric current and the monitoring system includes an active RF chip as described above, generating a signal to a transmitter of the tire pressure of the wheels. The vehicle monitoring system of this invention may also be utilized to monitor the position of the slack adjuster of the braking system. As will be understood, the push rod 32 of the brake actuator is pivotally connected to a slack adjuster which rotates upon axial movement of the push rod to actuate the foundation brake of the vehicle. The rotational movement of the slack adjuster relative to the spline of the foundation brake can be measured by the vehicle monitoring system of this invention to monitor the vehicle brake. Various types of sensors and magnets may also be utilized with the vehicle monitoring system of this invention. Having described preferred embodiments of the vehicle and brake actuator monitoring system of this invention, the invention is now claimed, as follows:

What is the claimed is:

1. A vehicle monitoring system for monitoring a condition of a first component moving relative to a second component, one of said first and second components including a magnet and the other of said components including an electrically conductive coil within a magnetic field of said magnet, a sensor located within said magnet field and an active RF chip connected to said coil and said sensor, whereby said sensor monitoring movement of said magnet and movement of said magnet relative to said electrically conductive coil generating an electrical current which activates said RF chip to signal a condition of said one of said first and second components to a remote RF receiver.

2. The vehicle monitoring system as defined in claim 1, wherein said magnet moves in said coil.

3. The vehicle monitoring system as defined in claim 1, wherein said magnet is fixed relative to said first component, said second component is fixed relative to a vehicle and said first component moves relative to said vehicle.

4. The vehicle monitoring system as defined in claim 1, wherein said first component is a brake actuator fixed relative to a vehicle including a housing having an opening therethrough and said first component is a pushrod reciprocating through said opening in said housing.

5. The vehicle monitoring system as defined in claim 4, wherein said magnet is fixed on said pushrod and said electrically conductive coil is fixed relative to said housing surrounding said opening through said housing.

6. The vehicle monitoring system as defined in claim 5, wherein said magnet comprises an elongated strip including a series of discrete magnets in end to end relation and said sensor continuously senses reciprocal motion of said pushrod.

7. The vehicle monitoring system as defined in claim 5, wherein said coil is located in a sleeve fixed to said housing surrounding said opening in said housing.

8. The vehicle monitoring system as defined in claim 7, wherein said sleeve is a stone shield surrounding said opening in said housing and preventing debris from entering said housing through said opening.

9. The vehicle monitoring system as defined in claim 1, wherein said sensor is a Hall-effect sensor.

10. A vehicle brake monitoring system, comprising:

a brake actuator including an enclosed housing, an opening through said housing and a pushrod reciprocating through said opening in said housing for actuating a vehicle brake, a magnet on said pushrod, an electrically conductive coil fixed relative to said housing within a magnetic field of said magnet generating an electrical current upon reciprocal motion of said pushrod, and an active RF chip connected to said coil receiving said electric current from said coil and generating a signal indicating a position of said pushrod to a receiver.

11. The vehicle brake monitoring system as defined in claim 10, wherein said electrically conductive coil is located in a sleeve surrounding said opening through said housing and said coil surrounds said pushrod.

12. The vehicle brake monitoring system as defined in claim 11, wherein said sleeve is a stone shield including a portion located within said housing.

13. The vehicle brake monitoring system as defined in claim 10, wherein said vehicle brake monitoring system includes a sensor within said magnetic field connected to said RF chip sensing a location of said pushrod relative to said sensor.

14. The vehicle brake monitoring system as defined in claim 13, wherein said sensor is a Hall-effect sensor.

15. The vehicle brake monitoring system as defined in claim 10, wherein said magnet comprises a series of discrete magnets in end to end relation fixed to said pushrod.

16. A vehicle brake monitoring system, comprising:

a brake actuator including an enclosed housing, an opening through said housing and a pushrod reciprocating through said opening in said housing for activating a vehicle brake, a magnet fixed to said pushrod, an electrically conductive coil fixed relative to said housing surrounding said pushrod and said magnet generating an electric current upon movement of said pushrod and said magnet, a sensor within a magnetic field of said magnet, and an active RF chip connected to said sensor receiving a signal from said sensor indicating a position of said pushrod and connected to said coil receiving said electrical current from said coil, said active chip generating a signal to a remote receiver of said position of said pushrod.

17. The vehicle brake monitoring system as defined in claim 16, wherein said coil, sensor and RF chip are located in a sleeve surrounding said pushrod.

18. The vehicle brake monitoring system as defined in claim 16, wherein said magnet comprises an elongated strip of discrete magnets aligned in end to end relation fixed to said pushrod.

19. The vehicle brake monitoring system as defined in claim 16, wherein said sensor is a Hall-effect sensor.

* * * * *